US009765666B2

(12) United States Patent
Smith et al.

(10) Patent No.: US 9,765,666 B2
(45) Date of Patent: Sep. 19, 2017

(54) DUAL PATH AFTERTREATMENT SYSTEM AND METHOD UTILIZING FUEL AS AN ON-BOARD REDUCTANT FOR NOX SCR

(71) Applicants:Michael A Smith, Clarkston, MI (US); Craig L Dimaggio, Troy, MI (US); Jeffrey P Wuttke, Sterling Heights, MI (US); Andrew Brocker, Brighton, MI (US); Travis T Hamilton, Westland, MI (US); Ken Hardman, Clarkston, MI (US); Cody Baldwin-Squib, White Lake, MI (US)

(72) Inventors: Michael A Smith, Clarkston, MI (US); Craig L Dimaggio, Troy, MI (US); Jeffrey P Wuttke, Sterling Heights, MI (US); Andrew Brocker, Brighton, MI (US); Travis T Hamilton, Westland, MI (US); Ken Hardman, Clarkston, MI (US); Cody Baldwin-Squib, White Lake, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 15/018,993

(22) Filed: Feb. 9, 2016

(65) Prior Publication Data
US 2016/0230632 A1    Aug. 11, 2016

Related U.S. Application Data

(60) Provisional application No. 62/114,646, filed on Feb. 11, 2015.

(51) Int. Cl.
*F01N 3/00*    (2006.01)
*F01N 3/10*    (2006.01)
(Continued)

(52) U.S. Cl.
CPC ......... *F01N 3/2073* (2013.01); *F01N 3/0814* (2013.01); *F01N 3/0842* (2013.01);
(Continued)

(58) Field of Classification Search
CPC ...... F01N 3/0814; F01N 3/0842; F01N 3/106; F01N 3/2073; F01N 3/208; F01N 13/008;
(Continued)

(56) References Cited

U.S. PATENT DOCUMENTS 6,047,542 A    4/2000  Kinugasa et al.
7,673,446 B2    3/2010  Zemskova
(Continued)

FOREIGN PATENT DOCUMENTS

DE    102007039588 A1    2/2009

OTHER PUBLICATIONS

International Search and Report and Written Opinion dated May 3, 2016 for International Application No. PCT/US2016/017278, International Filing Date Feb. 10, 2016.

*Primary Examiner* — Phutthiwat Wongwian
*Assistant Examiner* — Diem Tran
(74) *Attorney, Agent, or Firm* — Ralph E. Smith

(57) ABSTRACT

A system and method for utilizing fuel as an on-board reductant for selective catalytic reduction of NOx is provided and includes a controller for controlling an engine to produce a lean first exhaust stream and a rich second exhaust stream that are received in respective first and second passageways of a dual path aftertreatment system. The rich second exhaust stream reacts with NOx stored in a NOx storage and reduction catalyst of the second passageway to regenerate this catalyst and generate ammonia. The first exhaust stream and the second exhaust stream having the generated ammonia are combined in a downstream common passageway to form a combined lean exhaust gas stream
(Continued)

where the ammonia carried therein is stored or used by an SCR catalyst of the common passageway for NOx reduction. The engine is subsequently controlled to produce a rich first exhaust stream and a lean second exhaust stream.

18 Claims, 7 Drawing Sheets

(51) Int. Cl.
    *F01N 3/20*     (2006.01)
    *F01N 13/00*     (2010.01)
    *F01N 13/10*     (2010.01)
    *F01N 3/08*     (2006.01)
    *F01N 13/04*     (2010.01)

(52) U.S. Cl.
    CPC ............. *F01N 3/106* (2013.01); *F01N 3/208* (2013.01); *F01N 13/008* (2013.01); *F01N 13/011* (2014.06); *F01N 13/04* (2013.01); *F01N 13/107* (2013.01); *F01N 2240/25* (2013.01); *F01N 2430/02* (2013.01); *F01N 2430/06* (2013.01); *F01N 2610/02* (2013.01); *F01N 2900/1616* (2013.01); *F01N 2900/1814* (2013.01); *Y02T 10/24* (2013.01)

(58) Field of Classification Search
    CPC ...... F01N 13/011; F01N 13/04; F01N 13/107; F01N 2240/25; F01N 2610/02; F01N 2900/1616; F01N 2900/1814; F01N 2430/02; F01N 2430/06
    USPC .................. 60/285, 287, 288, 295, 297, 301
    See application file for complete search history.

(56) References Cited

U.S. PATENT DOCUMENTS

| | | |
|---|---|---|
| 7,776,280 B2 | 8/2010 | Telford |
| 2004/0040287 A1 | 3/2004 | Beutel et al. |
| 2007/0068142 A1* | 3/2007 | Robel .................... F01N 3/106 60/285 |
| 2010/0050613 A1 | 3/2010 | Bailey |
| 2010/0236224 A1 | 9/2010 | Kumar et al. |
| 2013/0202507 A1* | 8/2013 | Echoff .................. F01N 3/0814 423/213.5 |
| 2015/0107229 A1 | 4/2015 | Fuchsbauer et al. |

* cited by examiner

DUAL PATH AFTERTREATMENT SYSTEM AND METHOD UTILIZING FUEL AS AN ON-BOARD REDUCTANT FOR NOX SCR

CROSS-REFERENCE TO RELATED APPLICATIONS

This application claims benefit of U.S. Provisional Application Ser. No. 62/114,646 filed on Feb. 11, 2015. The disclosure of the above application is incorporated herein by reference in its entirety.

FIELD

The present application relates generally to exhaust aftertreatment systems, such as selective catalytic reduction (SCR) systems for automotive applications, and more particularly to a dual path exhaust aftertreatment system and method utilizing fuel as an on-board reductant for NOx SCR.

BACKGROUND

Diesel engine exhaust systems often include an aftertreatment system to reduce emissions. One method used to reduce emissions from a diesel engine is selective catalytic reduction (SCR). SCR provides a method for removing NOx from an exhaust stream through use of an SCR catalyst that facilitates a reaction between the exhaust gas, ammonia and NOx to produce water vapor and nitrogen gas thereby removing NOx from the exhaust gas. The ammonia used for SCR is typically stored in an ammonia storage system for injection when needed. Such on-board ammonia storage systems and the associated ammonia injection systems add cost, complexity and weight to the vehicle. Thus, while such exhaust aftertreatment systems using ammonia storage and injection work for their intended purpose, there remains a need for improvement in the relevant art.

SUMMARY

In accordance with an exemplary aspect of the invention, a system for utilizing fuel as an on-board reductant for selective catalytic reduction is provided in accordance with the teachings of the present application. In one exemplary implementation, the system includes an engine, a dual path aftertreatment system and a controller. The engine includes a first set of cylinders configured to produce a first exhaust gas stream and a second set of cylinders configured to produce a second exhaust stream separate from the first exhaust stream. The dual path aftertreatment system includes a first exhaust gas passageway, a second exhaust gas passageway and a common exhaust gas passageway. The first exhaust gas passageway is fluidly coupled to only the first set of cylinders so as to receive only the first exhaust stream, and the second exhaust gas passageway is separate from the first exhaust gas passageway and fluidly coupled to only the second set of cylinders so as to receive only the second exhaust stream. The first and second exhaust gas passageways include respective first and second NOx storage and reduction catalysts. The common exhaust gas passageway is coupled to the first and second exhaust gas passageways at a junction downstream of the respective NOx storage reduction catalysts, and includes an oxidation catalyst downstream of an SCR catalyst configured to receive the first and second exhaust gas streams to form a combined exhaust gas stream. The controller is in communication with the engine and configured to control the engine at a first period of time and a second period of time later than the first period of time. The engine is controlled at the first period of time to produce a lean first exhaust gas stream and a rich second exhaust gas stream; wherein the second NOx storage and reduction catalyst facilitates a reaction with stored NOx and the rich second exhaust gas stream to regenerate the second NOx storage and reduction catalyst and generate ammonia; and wherein the combined exhaust gas stream at the first period of time includes the generated ammonia from the second exhaust gas passageway for storage or use by the SCR catalyst to reduce NOx. The engine is controlled at the second period of time to produce a rich first exhaust gas stream and a lean second exhaust gas stream; wherein the first NOx storage and reduction catalyst facilitates a reaction with stored NOx and the rich first exhaust gas stream to regenerate the first NOx storage and reduction catalyst and generate ammonia; and wherein the combined exhaust gas stream at the second period of time includes the generated ammonia from the first exhaust gas passageway for storage or use by the SCR catalyst to reduce NOx. The controller is also configured to control the engine at the first and second periods of time to maintain a net lean combined exhaust gas stream in the common exhaust gas passageway upstream of the SCR catalyst, thereby enabling the oxidation catalyst to oxidize HC and CO that are present in the respective combined exhaust gas streams from the respective rich exhaust gas streams.

In another exemplary aspect of the invention, a method for utilizing fuel as an on-board reductant for selective catalytic reduction is provided in accordance with the teachings of the present application. In one exemplary implementation, the method includes controlling an engine at a first period of time to combust a lean first fuel/air mixture in a first set of cylinders of the engine and produce a lean first exhaust gas stream and to combust a rich second fuel/air mixture in a second set of cylinders of the engine and produce a rich second exhaust stream separate from the lean first exhaust stream. The lean first exhaust gas stream is received in only a first exhaust gas passageway of a dual path aftertreatment system, where the first exhaust gas passageway is fluidly coupled to only the first set of cylinders. The rich second exhaust gas stream is received in only a second exhaust gas passageway of the dual path aftertreatment system, where the second exhaust gas passageway is fluidly coupled to only the second set of cylinders and separate from the first exhaust gas passageway, and where the first and second exhaust gas passageways include respective first and second NOx storage and reduction catalysts. The second NOx storage and reduction catalyst is regenerated with the rich second exhaust gas stream and ammonia is generated. The rich second exhaust gas stream having the generated ammonia and the lean first exhaust gas stream are then combined into a first combined exhaust gas stream in a common exhaust gas passageway coupled to the first and second exhaust gas passageways at a junction downstream of the respective NOx storage reduction catalysts, where the common exhaust gas passageway includes an SCR catalyst and a downstream oxidation catalyst. The first combined exhaust gas stream includes the generated ammonia from the second exhaust gas passageway for storage or use by the SCR catalyst to reduce NOx, and the engine is controlled at the first period of time to maintain a net lean first combined exhaust gas stream in the common exhaust gas passageway upstream of the SCR catalyst, thereby enabling the oxidation catalyst to oxidize HC and CO that are present in the combined exhaust gas stream from the rich second exhaust gas stream.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Figure 1:
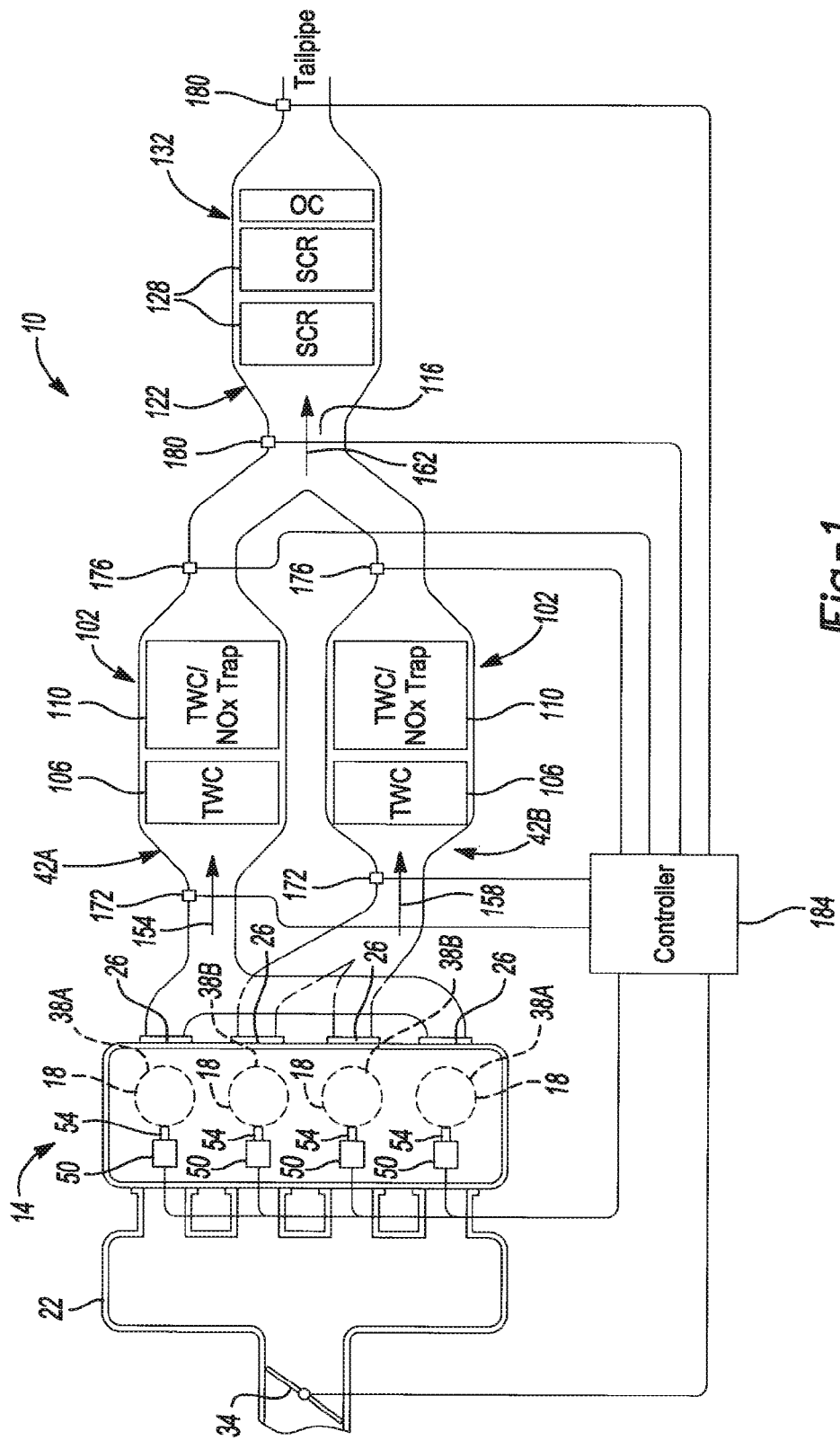
FIG. 1 is a schematic illustration of an exemplary dual path exhaust aftertreatment system associated with an exemplary in-line engine in accordance with the principles of the present application.

With initial reference to FIG. 1, an exemplary dual path exhaust aftertreatment system is shown and generally identified at reference numeral 10. The dual path exhaust aftertreatment system is coupled to an exemplary engine schematically shown and generally identified at reference numeral 14. As generally discussed above, one potential drawback of conventional aftertreatment systems is the requirement of an on-board storage system for ammonia and an on-board injection system for injecting the same for use in SCR of NOx.

Accordingly, and as will be discussed in greater detail below, the dual path aftertreatment system and associated control methodology of the present application includes a split exhaust system creating two separate exhaust flow paths from a single associated engine, where the engine is selectively controlled in cooperation with the dual path exhaust aftertreatment system to utilize fuel to generate on-board ammonia for use in SCR of NOx. In the exemplary system illustrated in the various figures, each path of the dual path exhaust aftertreatment system includes at least one close coupled catalyst arrangement, such as a Three-way Catalyst (TWC) and/or TWC NOx Trap (TWCLNT or TWCNSC).

In this exemplary implementation, the emissions aftertreatment system is a passive design utilizing two separate flow paths joining together at a junction upstream of a selective reduction catalyst (SCR) or catalysts, which uses ammonia ($NH_3$) generated by selective control of the engine to operate one group of cylinders in a rich operating mode to reduce nitrogen oxides (NOx). As a result, the exhaust system and associated vehicle does not include or require an ammonia storage system or an ammonia injection system.

For example and as will also be discussed in greater detail below, each flow path includes close-coupled catalysts and the engine 14 is controlled to: i) combust a lean fuel/air mixture in both groups of cylinders whenever possible to maximize fuel economy; and ii) selectively combust a lean fuel/air mixture in one group of engine cylinders associated with one exhaust path and combust a rich fuel/air mixture in the other group of engine cylinders associated with the other exhaust path, thereby generating $NH_3$ for use by the SCR catalyst(s) while providing for fuel economy benefits of lean operation for at least a portion of the engine. In one exemplary implementation, the system also includes one or more oxidation catalysts, such as one or more of an Ammonia Slip Catalyst (ASC), carbon monoxide (CO) Slip Catalyst (CSC) and/or a hydrocarbon trap, positioned downstream of the SCR catalyst(s), as will also be discussed in greater detail below.

Continuing with reference to FIG. 1, the engine 14 can be a conventional in-line engine that includes a plurality of cylinders 18 that are fluidly coupled to an intake manifold 22 and to exhaust ports 26, as is readily known in the art. As will be discussed below, engine can also be V-engine, such as a V-6. In the exemplary implementation illustrated in FIG. 1, the engine 14 is a four cylinder engine and the intake manifold 22 includes a common manifold associated with a single throttle valve 34. The dual path aftertreatment system 10 is coupled to the engine 14 such that a first group of cylinders 38A is fluidly coupled to a first path or branch 42A of the dual path aftertreatment system 10 and a second set or group of cylinders 38B is fluidly coupled to a second branch or path 42B of the dual path aftertreatment system 10, as will be discussed in greater detail below in connection with the dual path exhaust aftertreatment system 10.

It will be appreciated that while cylinders 1 and 2 are shown coupled to the first path 42A and cylinders 3 and 4 are shown coupled to the second path 42B, this is an exemplary configuration shown for simplicity of illustration and other combinations of two cylinders can be coupled to the first path 42A and other combinations of two cylinders can be coupled to the second path 42B. For example, cylinders 1 and 4 could be associated with the first path 42A and cylinders 2 and 3 could be associated with the second path 42B.

Engine 14, in the exemplary implementation shown in FIG. 1, includes a variable valve lift (VVL) system 50 configured to vary the lift of associated intakes valves 54, as is also known in the art. Such VVL systems can be electronic systems, hydraulic systems and/or electro-hydraulic systems. One example of an electro-hydraulic VVL system includes the MultiAir® VVL system included on engines in vehicles sold by FCA US LLC. Briefly, this VVL system generally utilizes electro-hydraulic variable valve actuation to control air intake (via intake valves) in a gasoline engine. Such control of the air intake via the intake valves is accomplished without utilizing a throttle valve and is compatible with both naturally aspirated and forced-induction engines. The intake valve or valves of each cylinder of the engine may be individually controlled, allowing for separate timing of each cylinder, and thus different fuel/air ratios in each cylinder. With WL system 50, the engine can be controlled, for example, to have the first group of cylinders combust a lean fuel/air mixture and the second group of cylinders combust a rich fuel/air mixture and vice-versa. A further discussion of this exemplary VVL system (i.e., MultiAir® VVL system) can be found in commonly owned U.S. patent application Ser. No. 14/848,437).

Figure 2:
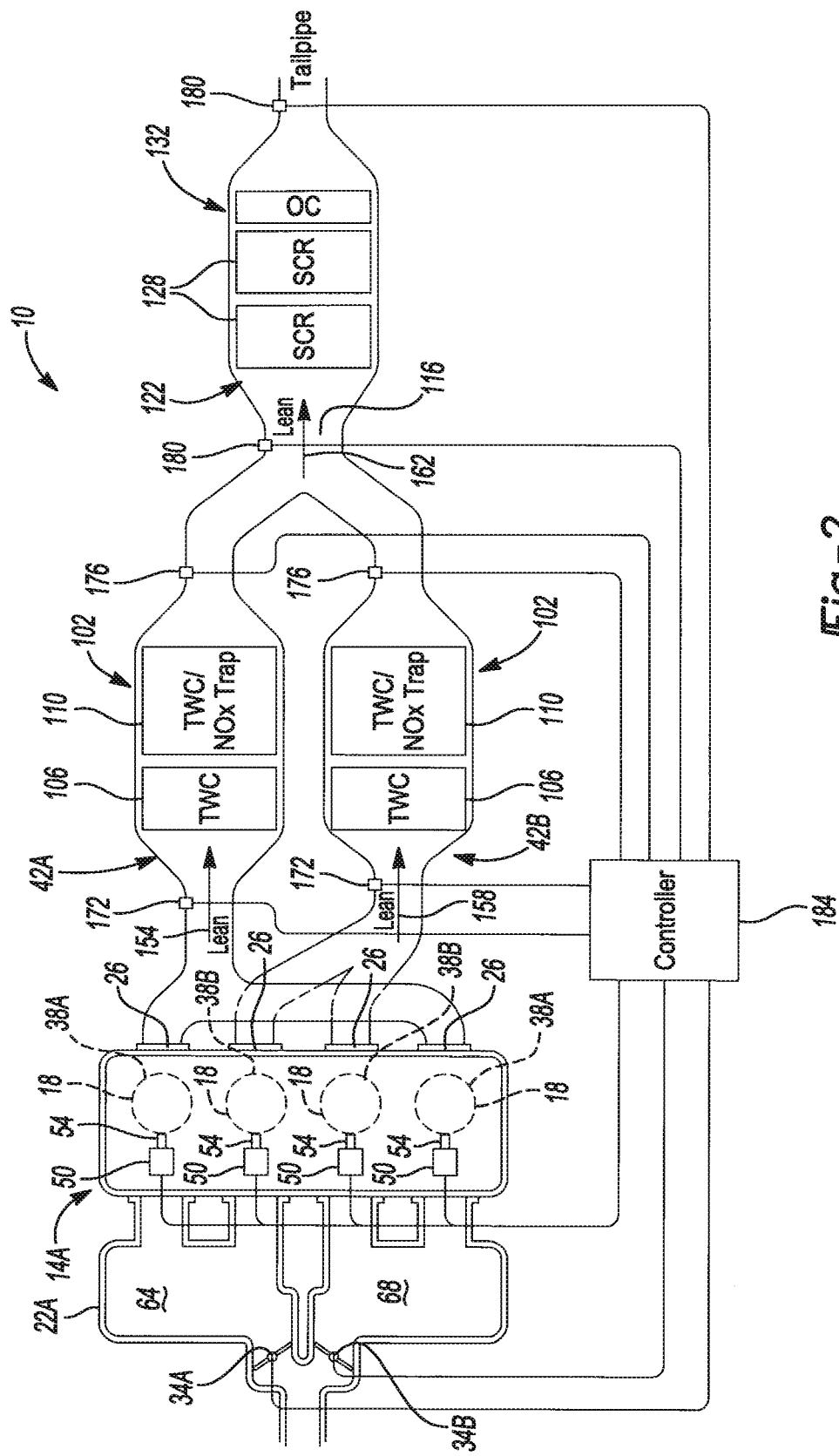
FIG. 2 is a schematic illustration of the exemplary dual path exhaust aftertreatment system of FIG. 1 associated with another exemplary in-line engine in accordance with the principles of the present application.

With reference to FIG. 2 and continuing reference to FIG. 1, another example implementation of engine 14 is shown in another exemplary implementation 14A where a split intake manifold 22A is utilized in place of or in conjunction with WL system 50. Thus, while WL system 50 is shown in this example implementation of engine 14A, it will be appreciated that the engine 14A may be implemented with split intake manifold 22A and without VVL system 50. Split intake manifold 22A, in the example illustrated, includes a first manifold area 64 and a second manifold area 68, where the first and second manifold areas 64, 68 are associated only with the respective first and second groups of cylinders 38A, 38B. For this implementation, split intake manifold 22A also includes or is associated with a first throttle valve 34A associated with the first manifold area 64 and a second throttle valve 34B associated with the second manifold area 68. Each throttle valve can be individually controlled to separately control intake air entering each group of cylinders 38A, 38B, thereby providing another method of individually controlling the fuel/air ratios of each group of cylinders 38A, 38B with or without using the VVL system 50.

Figure 3:
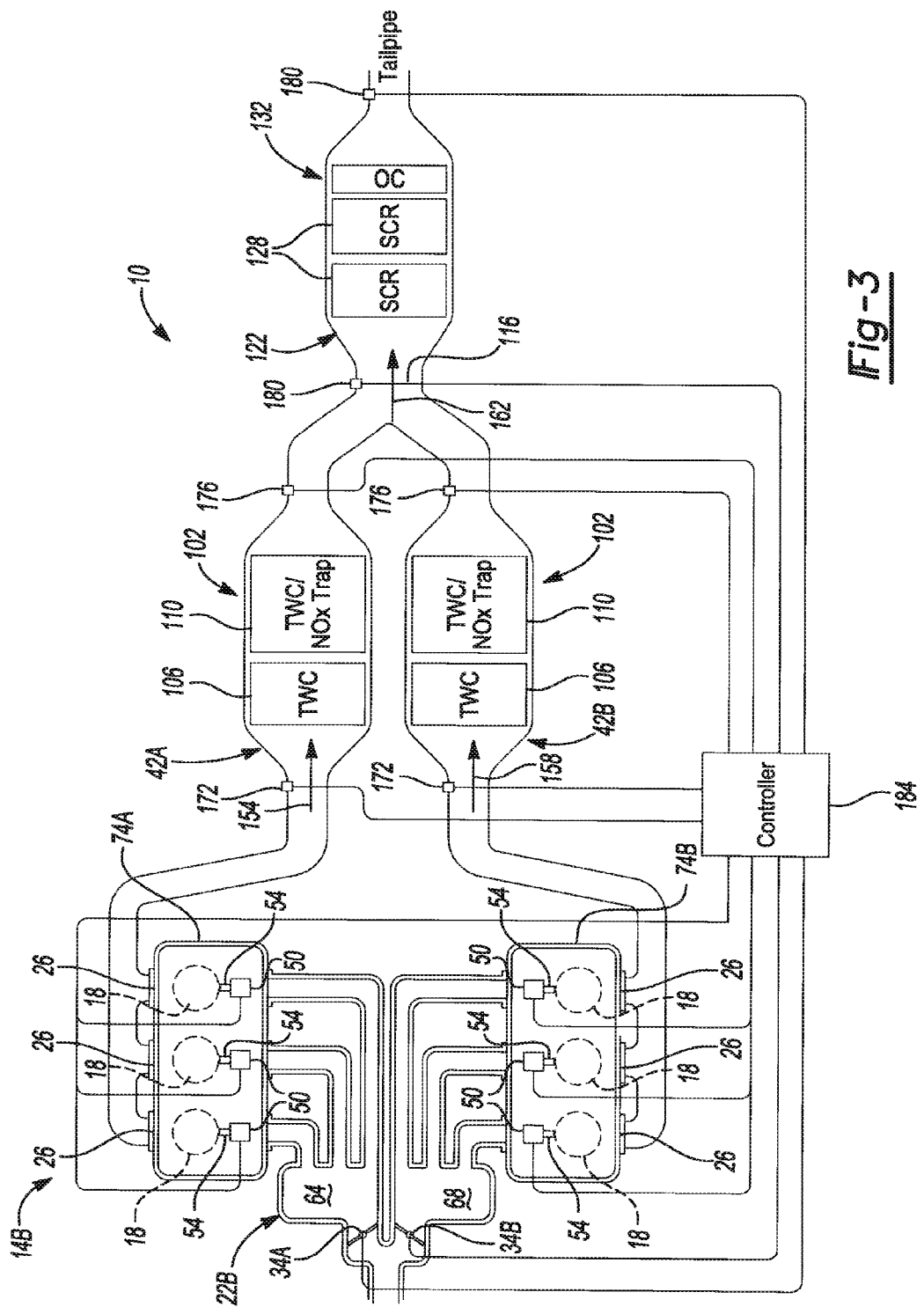
FIG. 3 is a schematic illustration of the dual path exhaust aftertreatment system of FIG. 1 associated with an exemplary V-engine in accordance with the principles of the present application.

Turning now to FIG. 3 and with continuing reference to FIGS. 1-2, engine 14 is shown in another exemplary implementation 14B, which is a V-engine configuration such as the example V-6 implementation illustrated. As shown, engine 14B includes a first bank of cylinders 74A and a second bank of cylinders 74B, as well as a split intake manifold configuration 22B and the VVL system 50. As with the discussion of engine example 14A above, engine 14B may be utilized with either or both of VVL system 50 and split intake manifold 22B having the first and second throttle valves 34A, 34B to separately control the fuel/air ratio in banks 74A, 74B. In the example illustrated, the first bank of cylinders 74A is coupled to the first exhaust path 42A and the second bank of cylinders 74B is coupled to the second exhaust path 42B.

It will be appreciated that while the discussion will continue with reference to engine 14A, the discussion is equally applicable and applies to each of the engine implementations discussed above, such as in-line engines (e.g., I4, I6, etc.) and V-engines (e.g., V6, v8, etc.), where the engine(s) can be controlled to combust different fuel/air mixtures in first and second groups of cylinders using the split intake manifold and/or the WL system. The first and second groups of cylinders, in each of these implementations, are separately coupled to only the first and second exhaust paths of the dual path exhaust aftertreatment system 10. It will also be appreciated that while the discussion will continue with reference to the first and second groups of cylinders, this includes and also makes reference to the first and second banks of cylinders discussed above.

With continuing reference to FIG. 1-3, the exemplary dual path exhaust aftertreatment system 10 will now be discussed in greater detail. As can be seen, the system 10 includes a partially split exhaust aftertreatment system with two separate flow paths or branches 42A, 42B for exhaust flowing out of the respective first and second groups of cylinders 38A, 38B of associated engine 14A. In the exemplary implementation illustrated, each flow path 42A, 42B includes at least one close coupled catalyst or catalyst configuration 102 and, in the exemplary implementation illustrated, each flow path includes a close coupled catalyst configuration 102 that includes a TVVC 106 and/or a combined TWC and Lean NOx Trap (TWLNT) 110, although it will be appreciated that the close coupled catalyst(s) could include one or more of the TWC 106, Lean NOx trap (LNT) or TWLNT 110. It will also be appreciated that the catalysts need not necessarily be close coupled catalysts as long as they are upstream of the SCR catalyst(s) discussed below. Further, it will also be appreciated that while the discussion will continue with reference to the lean NOx trap (LNT) 110 in connection with these close coupled catalysts, such reference will be understood to include at least a NOx storage and reduction catalyst or catalysts, as well as optionally the TWC and/or TWCLNT.

The separate dual flow paths 42A, 42B are coupled to the engine 14A and fluidly separate from each other until they join together at junction 116 downstream of the close coupled catalyst configurations 102, but upstream of the SCR catalyst(s), as shown for example in FIGS. 1-3. The junction 116 forms a beginning of a common or combined exhaust path 122 that includes one or more SCR catalysts 128 and optionally an oxidation catalyst 132 downstream thereof. With this dual path exhaust aftertreatment system 10, the engine 14A can be controlled to regulate a fuel/air ratio entering the first group of cylinders 38A such that they combust a fuel/air mixture to generate a first exhaust stream 154 that flows into only the first path 42A, and to regulate a fuel/air ratio entering the second group of cylinders 38B such that they combust a fuel/air mixture to generate a second exhaust stream 158 that flows into only the first path 42B. These first and second exhaust streams 154, 158 flow through the respective exhaust paths or branches 42A, 42B and, at the junction 116, form a combined exhaust gas stream 162 upstream of the SCR catalyst(s) 128.

Each of the flow paths 42A, 42B and 122 also includes one or more sensors configured to measure one or more parameters of the exhaust streams flowing therethrough, such as NOx sensors 172, ammonia sensors 176, and/or oxygen sensors 180. It will be appreciated, however, that more or less sensors may be utilized. Each of these sensors, as well as the VVL system 50 and throttle valves 34 and other known engine components are coupled to an engine controller, control circuit or electronic control unit/system 184.

As briefly discussed above, the unique dual flow path aftertreatment system 10 enables various different modes of engine 14A operation in addition to full engine lean operation, such as partial lean and partial rich operation at the same time, to generate or yield different operations in the close coupled catalyst arrangements 102 associated with each flow path 42A, 42B and the SCR catalyst(s) 128.

In one exemplary operating scenario and with reference to FIGS. 2 and 5-7, at block 204 the engine 14A initially (or at the beginning of an overall aftertreatment system cycle) is controlled (via throttle valve(s) 34 and/or VVL system 50) to regulate the fuel/air ratio entering the cylinders 18 to combust a lean fuel/air mixture in all cylinders (i.e., both groups of cylinders 38A, 38B). This operating mode of the engine can be advantageous as it provides for improved or increased fuel economy and is available at least when the LNTs 110 in both flow paths 42A, 42B have NOX storage capacity. In this operating scenario, the engine 14A would operate lean and the close coupled catalyst components 102 in each flow path 42A, 42B would remove NOx (through storage), CO (from oxidation) and hydrocarbons (HC) (from oxidation) from the exhaust gas streams 154, 158 flowing into each path 42A, 42B and the combined exhaust gas stream 162 before leaving the tailpipe, as depicted for example in FIG. 2.

As will be appreciated by one skilled in the art, as the LNT component reaches its NOx storage capacity, the stored NOx will have to be reduced. In a single path system, this typically occurs by operating the entire engine rich and reducing all of the stored NOx at the same time. In the unique system 10 of the present application, only part of the associated engine 14A would run rich, thereby regenerating the NOx trap(s) 110 one bank (or group of cylinders 38A, 38B) at a time. This operating scenario will, in turn, generate $NH_3$ that can be stored on the downstream SCR component(s) 128, where it can be used to reduce NOx in a net lean environment or stored until the catalyst is exposed to NOx.

For example and with particular reference to FIGS. 2 and 5-7, the controller 184 is configured to monitor the sensors associated with the dual path exhaust aftertreatment system 10 at block 208 so as to regenerate each LNT 110 alternately before they reach their storage capacity, such as a predetermined percentage of their storage capacity. In one exemplary implementation, as one of the LNTs 110 is reaching their NOx storage capacity (or predetermined capacity threshold) and before both of the LNTs 110 reach their NOx storage capacity, the controller 184 controls engine 14A to regenerate one of the LNTs 110 using on-board generation of ammonia and only the single engine 14A in connection with the same.

Figure 5:
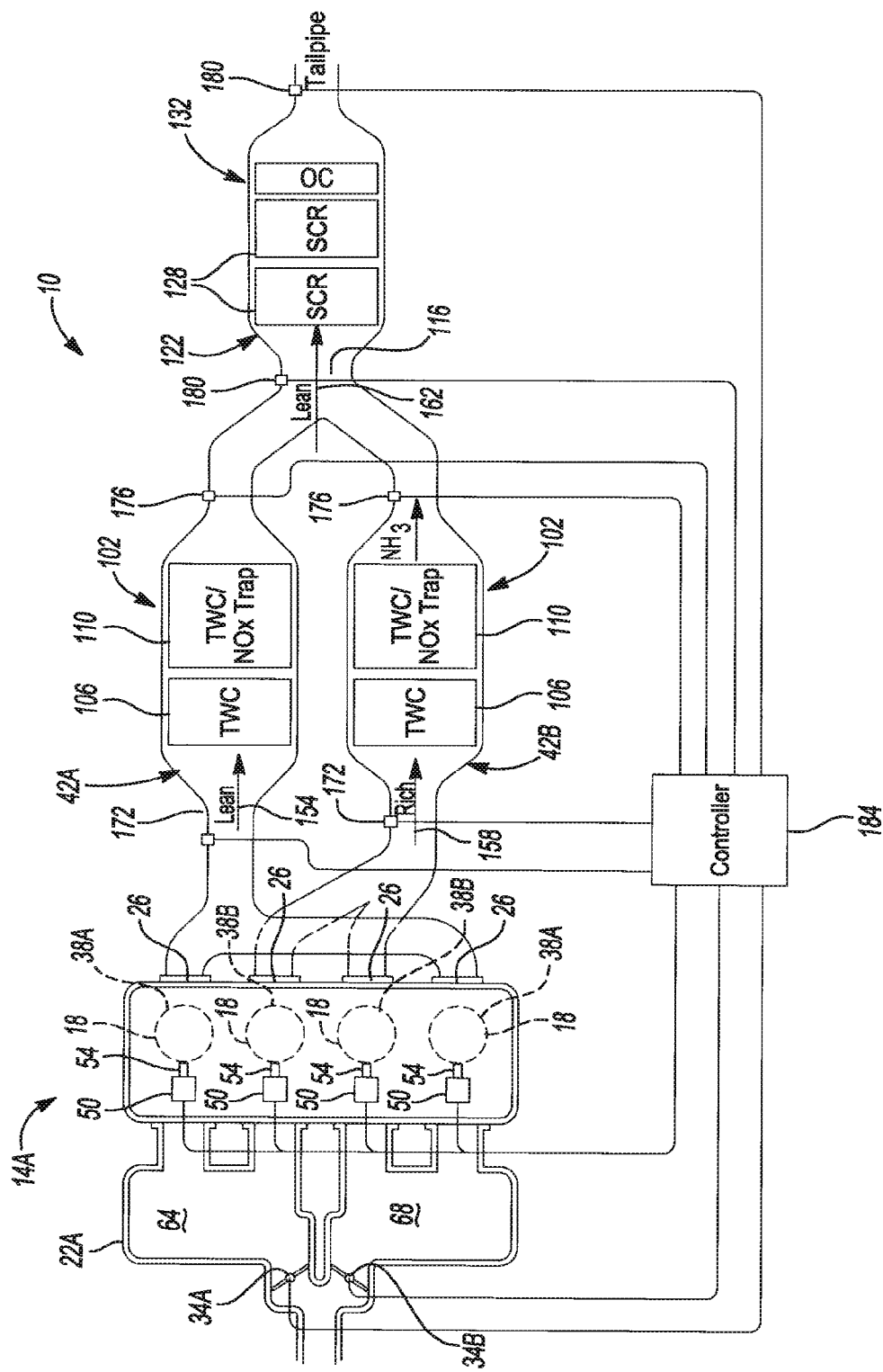
FIG. 5 is a schematic illustration of the dual path exhaust aftertreatment system of FIG. 2 showing exemplary operation in connection with the engine controlled for a one bank/set of cylinders lean operating mode and a one bank/set of cylinders rich operation mode in accordance with the principles of the present application.
Figure 6:
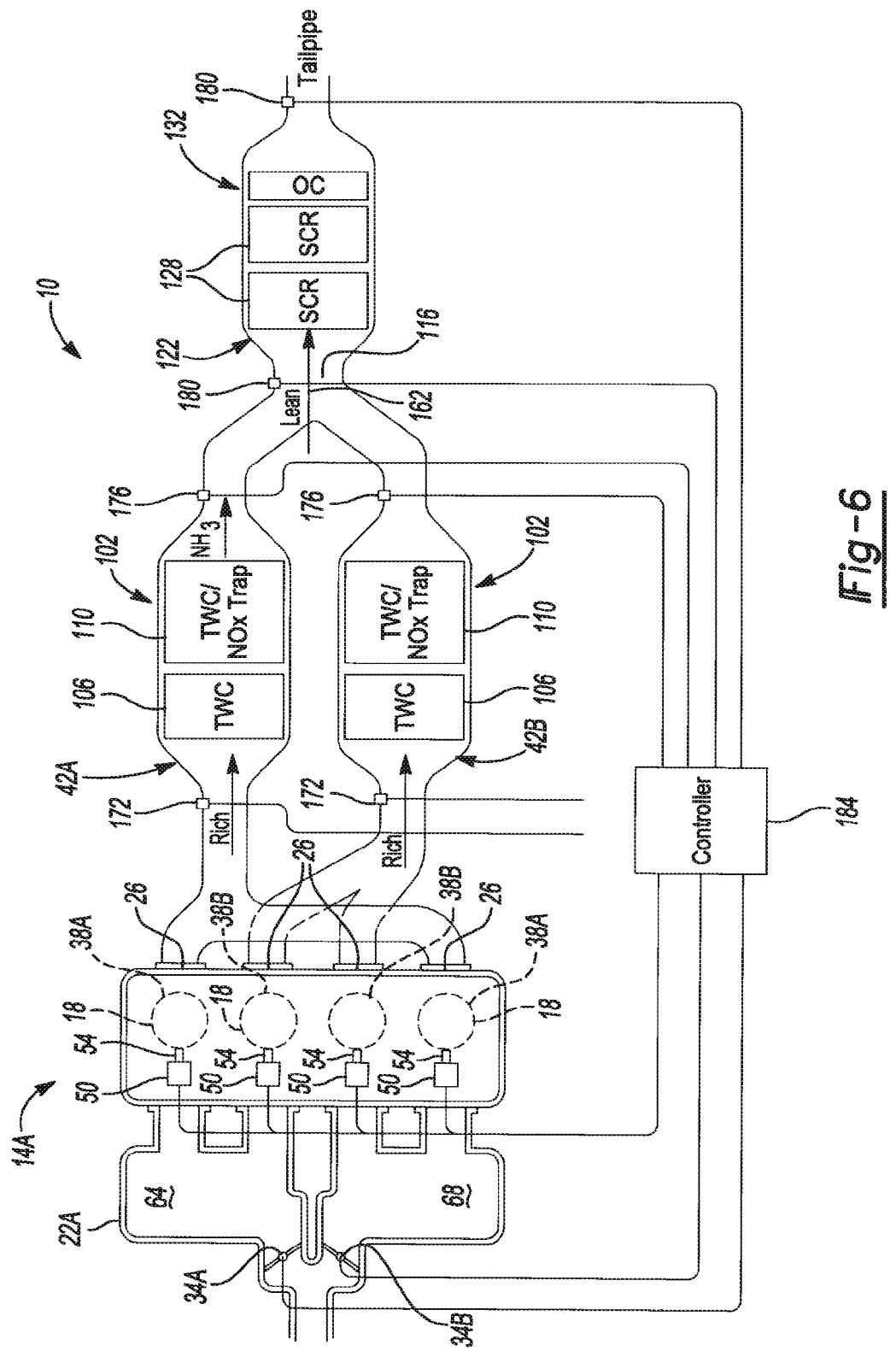
FIG. 6 is a schematic illustration of the dual path exhaust aftertreatment system of showing exemplary operation in connection with the engine controlled for a lean operating mode of the other bank/set of cylinders and a rich operation mode of the other bank/set of cylinders in accordance with the principles of the present application.
Figure 7:
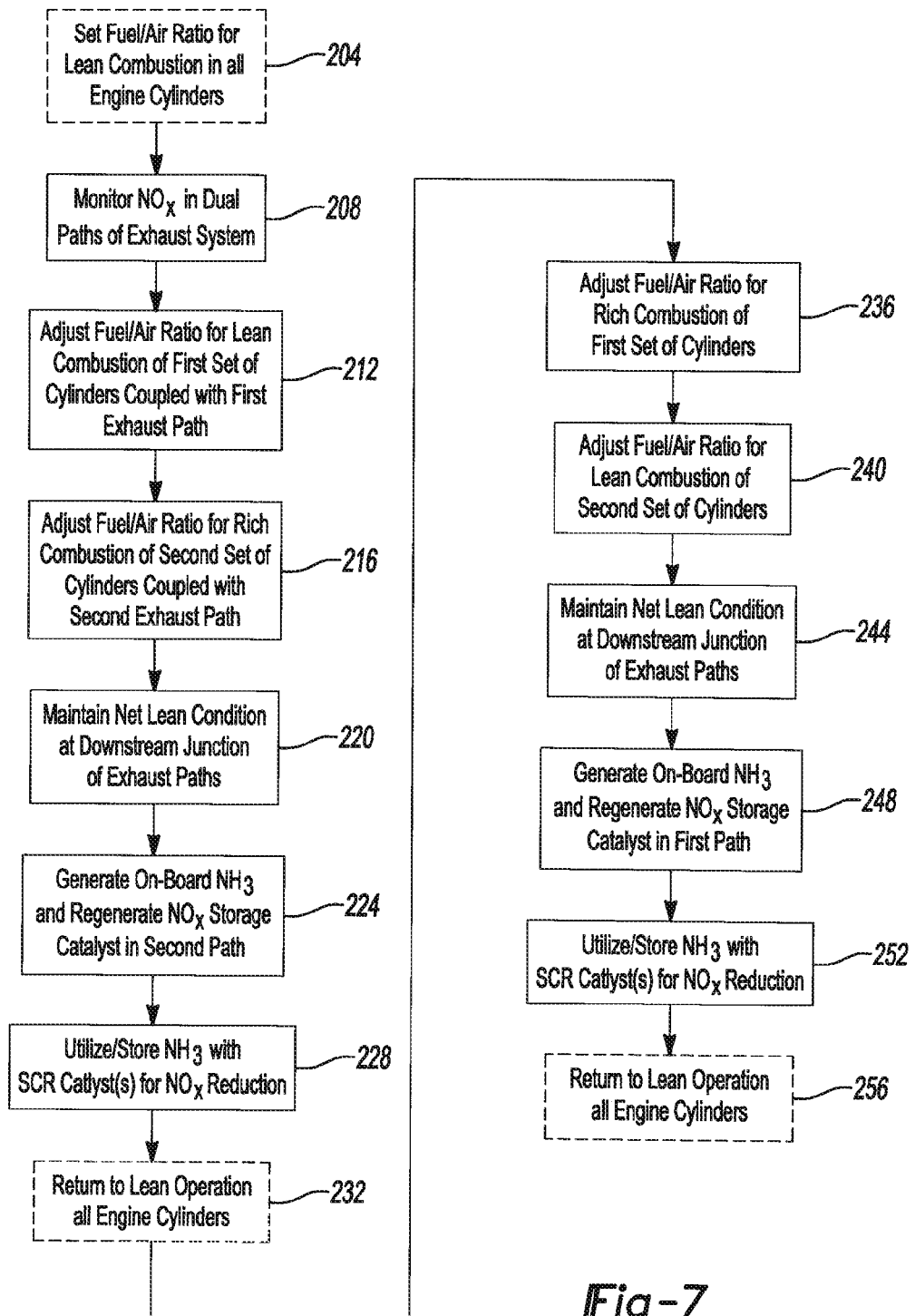
FIG. 7 is a flow diagram illustrating an example method of operating the exemplary dual path aftertreatment system in connection with the engine utilizing fuel as an on-board reductant for NOx SCR in accordance with the principles of the present application.

For example, the controller 184, with input from sensors 172 and 180, controls engine 14A to regenerate LNT 110 associated with the second flow path 42B, as shown for example in FIG. 5. In this example, at block 216, controller 184 regulates the fuel/air ratio entering the second group of cylinders 38B to combust a rich fuel/air mixture and generate a rich second exhaust stream 158 flowing into the second exhaust path 48B. Controller 184, at block 214, similarly controls engine 14 to regulate the fuel/air ratio entering the first group of cylinders 38A and combust a lean fuel/air mixture and generate a lean first exhaust stream 154 flowing into the first exhaust path 48A. It will be appreciated that while these steps are shown sequentially in FIG. 7, they can occur simultaneously.

At block 224, the rich second exhaust stream 158 regenerates the LNT 110 in the second flow path 42B and generates ammonia ($NH_3$) for downstream use by the SCR catalyst(s) 128, as will be discussed below. The ammonia ($NH_3$) can be generated, for example, on the TWC or the LNT when exposed to rich exhaust (exhaust $\lambda<1$) conditions. During such rich exhaust conditions, engine out NOx and $H_2$ (or CO through water gas shift) can combine to form $NH_3$ on Platinum Group Metal (PGM) based catalysts, such as the TWC or LNT components 106/110. The $NH_3$ can then be stored and used for lean NOx reduction downstream on the $NH_3$-SCR catalyst(s) 128.

The above-discussed ammonia generation and NOx reduction in the second exhaust path 42B occurs while the first exhaust path 42A receives the lean first exhaust stream 154, where the LNT 110 associated with this path traps NOx (up to the capacity of the LNT) and allows excess oxygen to pass through. The controller 84 is also configured to control the engine 14A, at block 220, such that the combusted rich and lean fuel/air mixtures and associated respective rich and lean second and first exhaust gas streams 158, 154 in this example combine at the junction 116 to form a net lean combined exhaust gas stream 162 upstream of the SCR catalyst(s) 128 to facilitate SCR of NOx via catalyst(s) 128 at block 228. Input from oxygen sensor 180 at junction 116 can, for example, be utilized by controller 184 for control of engine 14A to regulate the fuel/air ratios such that the rich and lean second and first exhaust streams 158, 154 are generated to as to maximize ammonia generation in the second path 42B while ensuring that the lean first exhaust gas 154 stream from path 42A, when combined at junction 116 with the rich second exhaust gas stream 158 (now with ammonia and CO), results in a net lean exhaust gas stream with ammonia and CO flowing toward the SCR catalyst(s) 128.

As briefly discussed above, the rich operation generation of $NH_3$ in the second flow path 42B upstream of the SCR catalyst(s) provides for, among other benefits, the ability to use a passive SCR aftertreatment system without separate onboard storage of ammonia or the like. Stated differently, this system eliminates the need for an active aftertreatment system requiring injection of ammonia or other reductant fluid. During this one bank/group of cylinders 38B rich operation, excess $NH_3$ is generated by the rich second exhaust stream and accumulated or stored on the downstream SCR catalyst(s) for later use, thereby allowing both banks/groups of cylinders 38A, 38B to return to lean operation after regeneration of the LNT 110 associated with the second exhaust path 38B in this example.

Upon return to lean operation of all cylinders 18 (i.e., both groups of cylinders 38A, 38B) at block 232, the engine 14A can be controlled to operate all cylinders 18 to combust a lean fuel/air mixture and generate lean first and second exhaust gas streams 154, 158 up to a point when the LNT 110 of the first exhaust path 42A approaches its storage capacity, such as up to a predetermined percentage of its storage capacity. At this point, the controller 184 could command regeneration of the LNT 110 associated with the first exhaust path 42A in a similar manner as discussed above for the LNT associated with second exhaust path 42B.

Alternatively, the engine 14A can be controlled to operate all cylinders 18 to combust a lean fuel/air mixture and generate lean first and second exhaust gas streams 154, 158 up to and after a point at which the LNT 110 in the first exhaust path 42A reaches its storage capacity. This will allow NOx to eventually slip through to the downstream SCR catalyst(s) 128, which can reduce the same due to the excess ammonia stored thereon from the prior regeneration/ammonia generation associated with the rich operating mode of the second group of cylinders 38B and second exhaust gas path 42B. In this example, the NOx would still be allowed to slip from the non-regenerated catalyst 110 of path 42A until all or substantially all of the stored $NH_3$ of the downstream SCR component(s)/catalyst(s) 128 is utilized. This provides for, among other advantages, an ability to maximize lean operating conditions of engine 14 to thereby increase fuel economy of the associated vehicle. This also provides for presenting both NOx and oxygen to the SCR catalyst(s) in a controlled manner, which increases the NOx conversion efficiency since the exhaust upstream of the SCR catalyst(s) is still net lean due to the excess oxygen present in the lean path.

Thereafter, the non-regenerated catalyst arrangement 102 of the first exhaust path 42A would be regenerated by rich operation of the first bank/group of cylinders 38A associated with this catalyst arrangement 102 and lean operation of the second bank/group of cylinders 38B associated with the second path 42B that was previously regenerated. For example and with particular reference to FIG. 6 in connection with continuing reference to FIGS. 2, 5 and 7, the controller 184 controls engine 14A to regulate a fuel/air ratio for the first group of cylinders 38A to combust a rich fuel/air mixture in the first group of cylinders 38A at block 236 thereby producing a rich first exhaust gas stream 154 flowing into only the first exhaust path 42A. At block 240, the controller 184 also controls engine 14A to regulate a fuel/air ratio for the second group of cylinders 38B to combust a lean fuel/air mixture and produce a lean second exhaust stream 158 flowing into only the second exhaust flow path 42B.

The dual path exhaust gas aftertreatment system 10 in connection with engine 14A would then operate in the same manner as discussed above, but with the paths reversed, so as to regenerate the LNT 110 associated with first flow path 42A and generate ammonia at block 248, while using the excess oxygen associated with the lean second exhaust gas stream 158 so as to maintain a net lean combined exhaust gas stream 162 at junction 116 (at block 244) with ammonia for use/storage in connection with downstream SCR catalyst(s) 128 to reduce NOx at block 252. Thereafter, the engine 14A can be controlled to return to lean operation of all cylinders 18 at block 256.

The operating scenarios and order could then continue as discussed above with switching of banks/groups of cylinders 38A, 38B for lean and rich operation as required to optimize efficiency of the aftertreatment system 10 and maximize lean burn operation time for fuel economy benefits while regenerating the NOx storage and reduction catalysts 110 as required based on their capacity and/or to generate ammonia for use by the SCR catalyst(s) 128.

In addition, the dual path aftertreatment system also provides for minimizing $N_2O$ production from the aftertreatment components by using the bank switching regeneration strategies discussed above. For example, the bank switching strategies (i.e., lean to rich strategies) can also be utilized to keep the heat of the close coupled catalysts above the $N_2O$ generation temperature. Use of the SCR catalyst(s) discussed above for NOx reduction with $NH_3$ also helps to reduce the $N_2O$ production.

Figure 4:
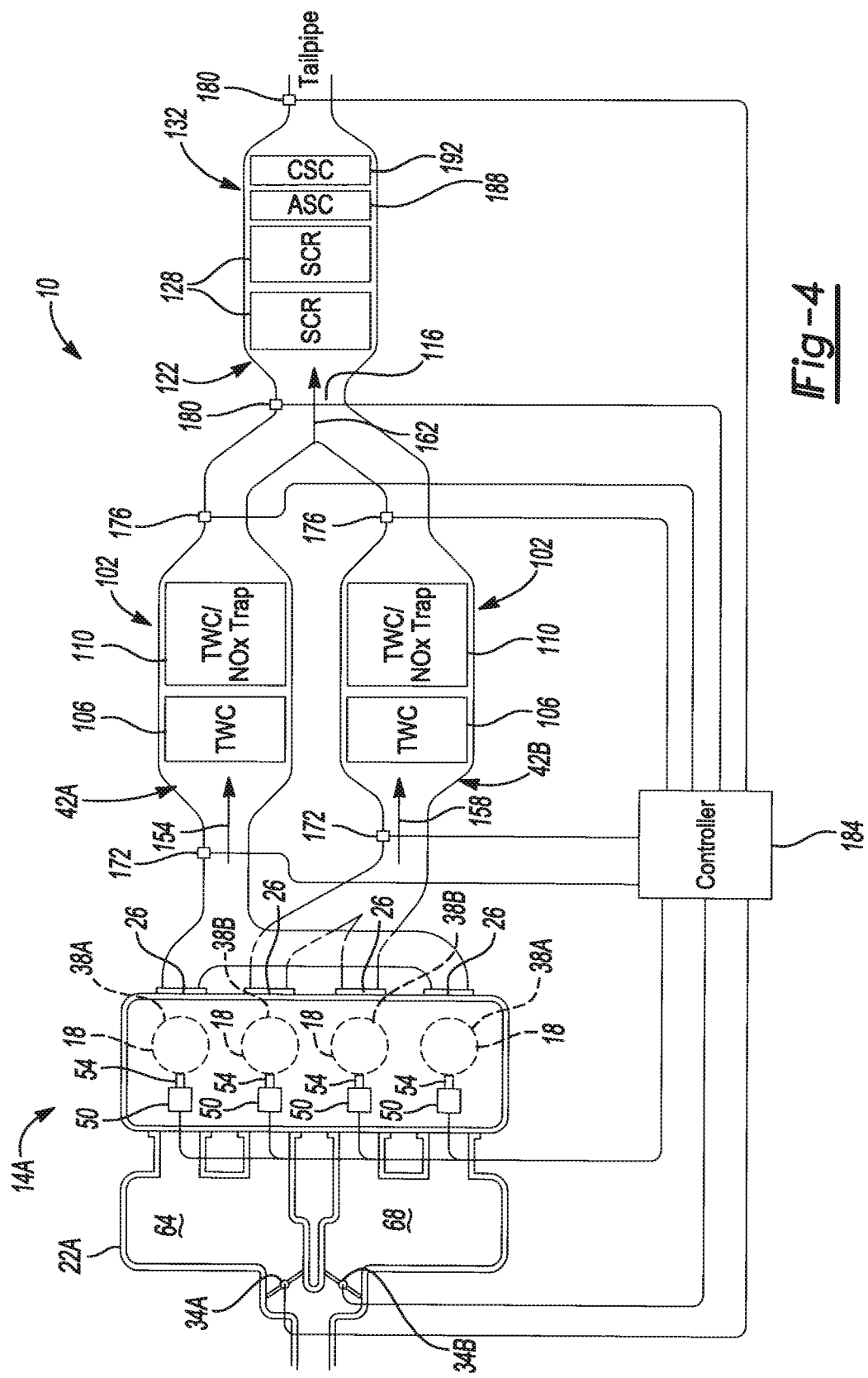
FIG. 4 is a schematic illustration of the dual path exhaust aftertreatment system and including an Ammonia Slip Catalyst (ASC) and/or a carbon monoxide (CO) Slip Catalyst (CSC) downstream of the SCR catalyst(s) in accordance with the principles of the present application.

While each of the banks/groups of cylinders 38A, 38B are controlled to operate in a rich condition, CO and HC may slip through or can be released from the rich operating bank/group of cylinders and are typically not removed by the downstream SCR catalyst(s) 128. To account for this, the oxidation catalyst 132, which may include one or more of an Ammonia Slip Catalyst (ASC) 188 and/or CO Slip Catalyst (CSC) 192 or both can be applied as the last component of the system (downstream of the SCR catalyst(s) 128), as particularly shown in FIG. 4 and otherwise shown generally in FIGS. 1-3 and 5-6 as oxidation catalyst 132.

Since only one bank/group of cylinders 38A, 38B is exposed to rich exhaust conditions while the other bank is maintained with lean conditions, there can be excess oxygen flowing in the exhaust gas through the SCR catalyst component 128, as discussed above. Applying the ASC 188, CSC 192, or other oxidation catalyst 132 as the last component provides for removal of CO and HC from the combined exhaust gas stream 162 flowing in the exhaust system while allowing the $NH_3$ to be generated from fuel without exceeding CO or HC emission standards. This configuration is also unique in that it allows for the removal of NOx, and with proper controls HC that are known to raise the light off temperature of the CSC 192 or other oxidation type catalysts 132.

In this configuration the inhibiting species (e.g., NOx) would be removed allowing for better utilization of the catalyst 132 and increased CO oxidation (conversion) at lower temperatures. In one exemplary implementation with both the ASC 188 and CSC 192 (FIG. 4) downstream of the SCR catalyst(s) 128, any $NH_3$ that potentially slips through the SCR catalyst(s) 128 can be removed by the ASC 188 and any CO that is not removed by the ASC 188 (e.g., due to lack of presence of enough oxygen and/or a temperature of the exhaust gas too low) can be oxidized by the CSC 192.

As discussed above, the dual path aftertreatment system and control methodologies provide for selective rich and lean bank operation, which can generate $NH_3$ while also controlling NOx slip to maximize the downstream SCR catalyst(s) conversion efficiency. The ability to generate $NH_3$ with the passive aftertreatment system discussed herein eliminates onboard storage of ammonia or ammonia compounds for an active injection system. The aftertreatment system provides the ability to use partial lean operation and partial rich operation at the same time, and limits CO emissions from passive SCR operation by providing excess air from the lean bank with excess CO from the rich bank. The aftertreatment system of the present application also provides for thermal protection of the ASC and CSC material by locating these components at the end of the aftertreatment system in the exhaust system. Further, the dual path aftertreatment system and operation provides for increasing lean operation time and thereby improving fuel economy.

It will be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A system for utilizing fuel as an on-board reductant for selective catalytic reduction, the system comprising:
   an engine including a first set of cylinders configured to produce a first exhaust gas stream and a second set of cylinders configured to produce a second exhaust stream separate from the first exhaust stream, wherein the first set of cylinders comprises one half of the total cylinders of the engine, and the second set of cylinders comprises the other half of the total cylinders of the engine;
   a dual path aftertreatment system including:
      a first exhaust gas passageway fluidly coupled to only the first set of cylinders so as to receive only the first exhaust stream, and a second exhaust gas passageway separate from the first exhaust gas passageway and fluidly coupled to only the second set of cylinders so as to receive only the second exhaust stream, the first and second exhaust gas passageways including respective first and second NOx storage and reduction catalysts;
      a common exhaust gas passageway coupled to the first and second exhaust gas passageways at a junction downstream of the respective NOx storage reduction catalysts, the common exhaust gas passageway including an oxidation catalyst downstream of an SCR catalyst and configured to receive the first and second exhaust gas streams to form a combined exhaust gas stream; and a controller in communication with the engine and configured to:

control the engine at a first period of time to produce a lean first exhaust gas stream and a rich second exhaust gas stream, wherein the second NOx storage and reduction catalyst facilitates a reaction with stored NOx and the rich second exhaust gas stream to regenerate the second NOx storage and reduction catalyst and generate ammonia, and wherein the combined exhaust gas stream at the first period of time includes the generated ammonia from the second exhaust gas passageway for storage or use by the SCR catalyst to reduce NOx; and control the engine at a second period of time later than the first period of time to produce a rich first exhaust gas stream and a lean second exhaust gas stream, wherein the first NOx storage and reduction catalyst facilitates a reaction with stored NOx and the rich first exhaust gas stream to regenerate the first NOx storage and reduction catalyst and generate ammonia, and wherein the combined exhaust gas stream at the second period of time includes the generated ammonia from the first exhaust gas passageway for storage or use by the SCR catalyst to reduce NOx;

wherein the controller is configured to control the engine at the first and second periods of time to maintain a net lean combined exhaust gas stream in the common exhaust gas passageway upstream of the SCR catalyst, thereby enabling the oxidation catalyst to oxidize HC and CO that are present in the respective combined exhaust gas streams from the respective rich exhaust gas streams;

wherein the first NOx storage and reduction catalyst in the first exhaust gas passageway comprises a first three-way catalyst (TWC) disposed upstream of a first combined TWC and lean NOx trap (TWLNT);

wherein the second NOx storage and reduction catalyst in the second exhaust gas passageway comprises a second TWC disposed upstream of a second combined TWC and TWLNT, and wherein the oxidation catalyst comprises an ammonia slip catalyst disposed upstream of a CO slip catalyst.

2. The system of claim 1, wherein controlling the engine at the first period of time to produce the lean first exhaust gas stream and the rich second exhaust gas stream includes controlling the engine to combust lean fuel/air mixtures in the first set of cylinders and rich fuel/air mixtures in the second set of cylinders.

3. The system of claim 2, wherein controlling the engine at the second period of time to produce the rich first exhaust gas stream and the lean second exhaust gas stream includes controlling the engine to combust rich fuel/air mixtures in the first set of cylinders and lean fuel/air mixtures in the second set of cylinders.

4. The system of claim 3, wherein the rich fuel/air mixtures are richer than stoichiometric condition and the lean fuel/air mixtures and leaner than stoichiometric condition.

5. The system of claim 3, wherein the total number of cylinders of the engine comprises four.

6. The system of claim 1, wherein at a third period of time after the first period of time and before the second period of time, the controller is configured to control the engine to combust lean fuel/air mixtures in all cylinders thereby producing lean first and second exhaust gas streams during the third period.

7. The system of claim 1, wherein at least a portion of the generated ammonia from the second exhaust gas passageway is stored on the SCR catalyst.

8. The system of claim 6, wherein each of the first and second exhaust gas passageways include a first sensor configured to sense a parameter indicative of an amount of NOx in the respective passageways, and a second sensor configured to sense an amount of ammonia in the respective passageways.

9. The system of claim 8, wherein the controller is configured to control the engine during the third period of time to produce the lean first and second exhaust gas streams in response to the sensed amount of ammonia and NOx.

10. The system of claim 9, wherein the controller is configured to control the engine to transition from the control of the engine at the third period of time to the control of the engine at the second period of time in response to a determination based on input from the first and second sensors that an amount of ammonia stored on the SCR catalyst is below a predetermined threshold.

11. The system of claim 10, wherein at a fourth period of time after the second period of time, the controller is configured to control the engine to combust lean fuel/air mixtures in all cylinders thereby producing lean first and second exhaust gas streams during the fourth period.

12. The system of claim 1, wherein the SCR catalyst comprises a first SCR catalyst and a second SCR catalyst, the second SCR catalyst disposed downstream of the first SCR catalyst and upstream of the ammonia slip catalyst.

13. A method for utilizing fuel as an on-board reductant for selective catalytic reduction, the method comprising:

controlling an engine at a first period of time to combust a lean first fuel/air mixture in a first set of cylinders of the engine and produce a lean first exhaust gas stream, and to combust a rich second fuel/air mixture in a second set of cylinders of the engine and produce a rich second exhaust gas stream separate from the lean first exhaust stream, wherein the first set of cylinders comprises one half of the total cylinders of the engine, and the second set of cylinders comprises the other half of the total cylinders of the engine;

receiving the lean first exhaust gas stream in only a first exhaust gas passageway of a dual path aftertreatment system, the first exhaust gas passageway being fluidly coupled to only the first set of cylinders, and receiving the rich second exhaust gas stream in only a second exhaust gas passageway of the dual path aftertreatment system, the second exhaust gas passageway being fluidly coupled to only the second set of cylinders and separate from the first exhaust gas passageway, the first and second exhaust gas passageways including respective first and second NOx storage and reduction catalysts;

regenerating the second NOx storage and reduction catalyst with the rich second exhaust gas stream and generating ammonia;

combining the rich second exhaust gas stream having the generated ammonia and the lean first exhaust gas stream into a first combined exhaust gas stream in a common exhaust gas passageway coupled to the first and second exhaust gas passageways at a junction downstream of the respective NOx storage reduction catalysts, the common exhaust gas passageway including an SCR catalyst and a downstream oxidation catalyst;

wherein the first combined exhaust gas stream includes the generated ammonia from the second exhaust gas passageway for storage or use by the SCR catalyst to reduce NOx; and controlling the engine at the first period of time to maintain a net lean first combined exhaust gas stream in the common exhaust gas passageway upstream of the SCR catalyst, thereby enabling the oxidation catalyst to oxidize HC and CO that are present in the combined exhaust gas stream from the rich second exhaust gas stream;

wherein the first NOx storage and reduction catalyst in the first exhaust gas passageway comprises a first three-way catalyst (TWC) disposed upstream of a first combined TWC and lean NOx trap (TWLNT);

wherein the second NOx storage and reduction catalyst in the second exhaust gas passageway comprises a second TWC disposed upstream of a second combined TWC and TWLNT; and wherein the oxidation catalyst comprises an ammonia slip catalyst disposed upstream of a CO slip catalyst.

14. The method of claim 13, further comprising:

controlling the engine at a second period of time later than the first period of time to produce a rich first exhaust gas stream and a lean second exhaust gas stream;

regenerating the first NOx storage and reduction catalyst with the rich first exhaust gas stream and generating ammonia;

combining the rich first exhaust gas stream having the generated ammonia and the lean second exhaust gas stream into a second combined exhaust gas stream in a common exhaust gas passageway during the second period of time;

storing the ammonia from the second combined exhaust gas stream at the SCR catalyst and/or using the ammonia with the SCR catalyst to reduce NOx; and controlling the engine during the second period of time to maintain a net lean second combined exhaust gas stream in the common exhaust gas passageway upstream of the SCR catalyst.

15. The method of claim 14, further comprising controlling the engine at a third period of time after the first period of time and before the second period of time to combust lean fuel/air mixtures in the first and second sets of cylinders thereby producing lean first and second exhaust gas streams during the third period.

16. The method of claim 15, wherein the controller is configured to control the engine during the third period of time to produce the lean first and second exhaust gas streams in response to a sensed amount of ammonia and NOx in the combined exhaust gas passageway.

17. The method of claim 15, further comprising controlling the engine to transition from the control of the engine at the third period of time to the control of the engine at the second period of time in response to a determination that an amount of ammonia stored on the SCR catalyst is below a predetermined threshold.

18. The method of claim 15, further comprising controlling the engine at a fourth period of time after the second period of time to combust lean fuel/air mixtures in the first and second sets of cylinders thereby producing lean first and second exhaust gas streams during the fourth period.

* * * * *